UNITED STATES PATENT OFFICE.

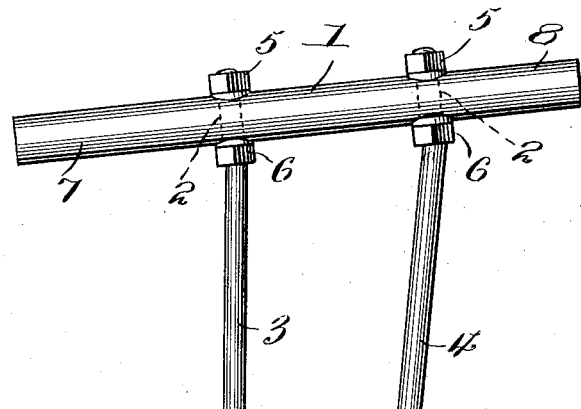
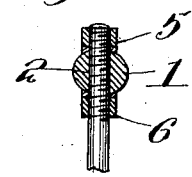
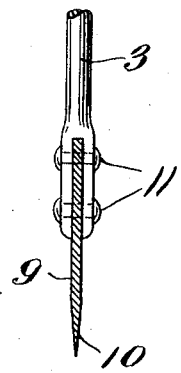
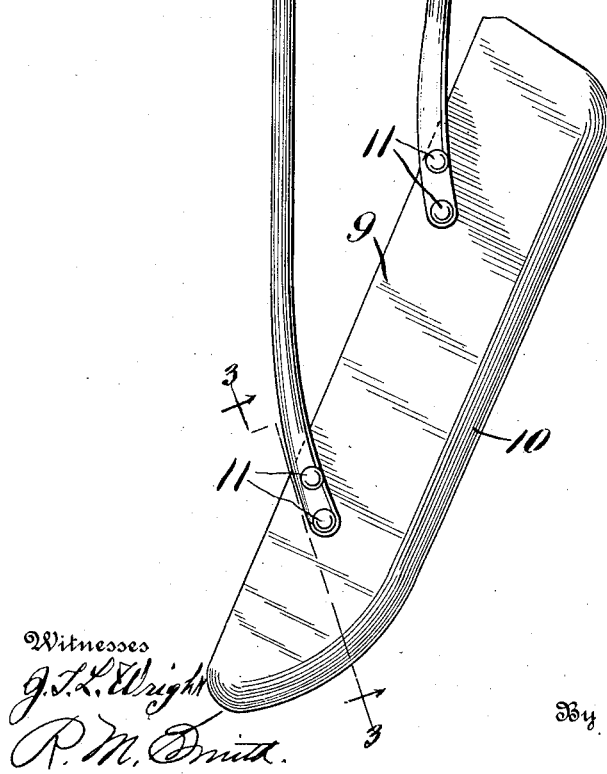

THEODORE O. ROLFSON, OF ESPLEE, MINNESOTA.

SOD-CUTTER.

1,043,729.  Specification of Letters Patent.  Patented Nov. 5, 1912.

Application filed July 2, 1912. Serial No. 707,328.

*To all whom it may concern:*

Be it known that I, THEODORE O. ROLFSON, a citizen of the United States, residing at Esplee, in the county of Marshall and State of Minnesota, have invented new and useful Improvements in Sod-Cutters, of which the following is a specification.

This invention relates to sod cutters, the object in view being to provide a very simple and effective cutter of the class described, which may be manipulated with great dexterity, and which will enable the operator to cut sod with far greater rapidity than the devices now in common use for that purpose.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a sod cutter, embodying the present invention. Fig. 2 is a detail section through the handle, showing the manner of connecting the shank members thereto. Fig. 3 is a cross section through the shearing blade, showing the manner of connecting the same to the shank members.

Referring to the drawings, 1 designates the handle of the sod cutter, the same consisting of a bar of any desired length and shape in cross section, but preferably round in cross section.

The handle 1 is provided at spaced points with holes 2 extending through the same to receive the upper extremities of a pair of substantially parallel shank members 3 and 4, the upper extremities thereof being reduced and threaded where they pass through the handle 1, so as to receive outer and inner nuts 5 and 6, respectively, said nuts bearing against the outer and inner sides of the handle 1, as clearly shown in the drawings. It will further be observed that the handle 1 projects at its opposite ends beyond the shank members 3 and 4, and that one end thereof forms a comparatively long projecting handle 7, while the other forms a comparatively short handle 8. This enables a greater leverage to be obtained on the end 7 than on the end 8, for a purpose which will hereinafter appear.

Secured to the opposite lower extremities of the shank members 3 and 4 is an obliquely disposed shearing blade 9 which is set at an acute angle with respect to the plane of the handle 1, so that in thrusting the whole device downwardly into the ground, a good clean shearing action is obtained between the cutting edge 10 of the blade 9, and the sod, resulting in a quick severance of the sod, the device being used very much after the manner of a hand saw, and being advanced at each reciprocating movement thereof.

The deeper the shearing blade 9 is thrust into the ground, the greater will become the inclination for said blade to tilt or swing, and this is compensated for by the longer end 7 of the handle, which enables the right hand of the operator to be placed any desired distance from the center of the handle to exert the requisite leverage on the shearing blade, as it is thrust downward through the sod.

In Fig. 3, I have shown the lower extremities of the members 3 and 4 bifurcated or slotted to receive the back edge of the shearing blade, which may be secured thereto by rivets 11 or their equivalent.

What is claimed is:

A sod cutter, comprising substantially parallel shank members, a T handle rigidly connecting said members at their upper extremities and having arms of unequal length, and a shearing cutter blade rigidly fastened to the lower extremities of said shank members, and set at an oblique angle with respect to the handle and shank members.

In testimony whereof I affix my signature in presence of two witnesses.

THEODORE O. ROLFSON.

Witnesses:
J. M. SUND,
HERMAN STROM.

Copies of this patent may be obtained for five cents each, by addressing the "Commissioner of Patents, Washington, D. C."